United States Patent [19]

Giles

[11] 3,906,265
[45] Sept. 16, 1975

[54] HONEYCOMB STATOR INSERTS FOR IMPROVED GENERATOR COOLING

[75] Inventor: Walter B. Giles, Scotia, N.Y.

[73] Assignee: General Electric Company, Schenectady, N.Y.

[22] Filed: May 15, 1974

[21] Appl. No.: 470,061

[52] U.S. Cl. .................................... 310/55; 310/61
[51] Int. Cl.² .......................................... H02K 9/00
[58] Field of Search ............ 310/52, 54, 53, 55, 56, 310/57, 58, 59, 60, 61, 64, 86

[56] References Cited
UNITED STATES PATENTS

| | | | |
|---|---|---|---|
| 2,917,644 | 12/1959 | Laffoon | 310/55 |
| 2,986,664 | 5/1961 | Willyoung | 310/61 |
| 3,110,827 | 11/1963 | Baudry | 310/55 |
| 3,254,246 | 5/1966 | Philofsky | 310/55 |
| 3,254,248 | 5/1966 | Hagen | 310/86 |
| 3,265,912 | 8/1966 | Baudry | 310/55 |
| 3,348,081 | 10/1967 | Willyoung | 310/55 |
| 3,505,546 | 4/1970 | Victor | 310/55 |
| 3,530,320 | 9/1970 | Davidson | 310/86 |
| 3,739,208 | 6/1973 | Shartrand | 310/58 |

Primary Examiner—R. Skudy
Attorney, Agent, or Firm—Donald R. Campbell; Joseph T. Cohen; Jerome C. Squillaro

[57] ABSTRACT

In a gas-cooled generator or other dynamoelectric machine, honeycomb stator inserts are mounted on the stator after assembly of the rotor extending into the gap therebetween. The peripherally continuous honeycomb baffling restricts axial leakage of the coolant and reduces the clearance to the rotor for enhanced self-pumping of coolant through the rotor. Radial rotor passages are preferred for improved cooling.

8 Claims, 6 Drawing Figures

3,906,265

HONEYCOMB STATOR INSERTS FOR IMPROVED GENERATOR COOLING

BACKGROUND OF THE INVENTION

This invention relates to gas-cooled dynamoelectric machines, and more particularly to a generator with stator mounted honeycomb-surfaced inserts and other modifications for the improved flow of coolant in the gap and rotor.

Large turbine-generators and other similar dynamoelectric machines are limited in capacity by the ability of the cooling system to remove heat from the rotor. As shown in U.S. Pat. No. 3,348,081 to D. M. Willyoung, the cooling system can be provided by radial ducts in the stator, a gap pickup rotor to scoop hydrogen gas coolant from the gap for circulation through internal passages in the rotor, and fans and heat exchangers to produce a coolant flow to ventilate the machine. There are large clearances of approximately three to four inches between the stator and rotor, hence an attempt to use fan or blower pressurization to drive the cooling hydrogen flow through the rotor tends to be thwarted by excessive leakage in this clearance. Partial radial baffles are used to restrict axial leakage from an outlet rotor zone to an inlet rotor zone. The present invention is directed to improved cooling in a generator or dynamoelectric machine working within the constraint, as regards any scheme for modifying the flow of coolant in the gap, that allowance must be made to assemble the completed rotor inside of the stator.

SUMMARY OF THE INVENTION

In accordance with the invention, one or more honeycomb stator inserts comprising a large cell honeycomb baffle structure defining radial passages for coolant flow are mounted on the stator extending into the gap between the stator and rotor of a gas-cooled dynamoelectric machine such as a generator of the foregoing type. Preferably, the plurality of honeycomb insert sectors are mounted adjacent to one another in the gap so as to be substantially peripherally continuous. The honeycomb baffling functions dually as axial baffles to restrict axial leakage of the coolant especially between cooling zones, and as peripheral baffles to effect a material reduction of the swirl flow in the gap. Since the relative velocity of the gas with respect to the rotor inlet and outlet ducts is increased, higher pumping pressures of coolant through the rotating rotor are realized for improved rotor cooling. Reduced axial leakage and nearly complete circumferential closure of the gap results in improved zone pressurization and utilization of the fans or blowers circulating the coolant.

The honeycomb stator inserts are inexpensive to manufacture and are constructed to be slidable in axially extending grooves on the stator after assembly of the rotor. In conjunction therewith, rotor cooling can be further improved by the use of radial rather than diagonal passages in the rotor connecting to axial ducts for circulation of coolant from an inlet to an outlet duct. This achieves higher coolant flows by eliminating the flow divider in the creepage block structure used in the prior art diagonal passage arrangement.

DESCRIPTION OF THE PREFERRED EMBODIMENT

Figure 1:
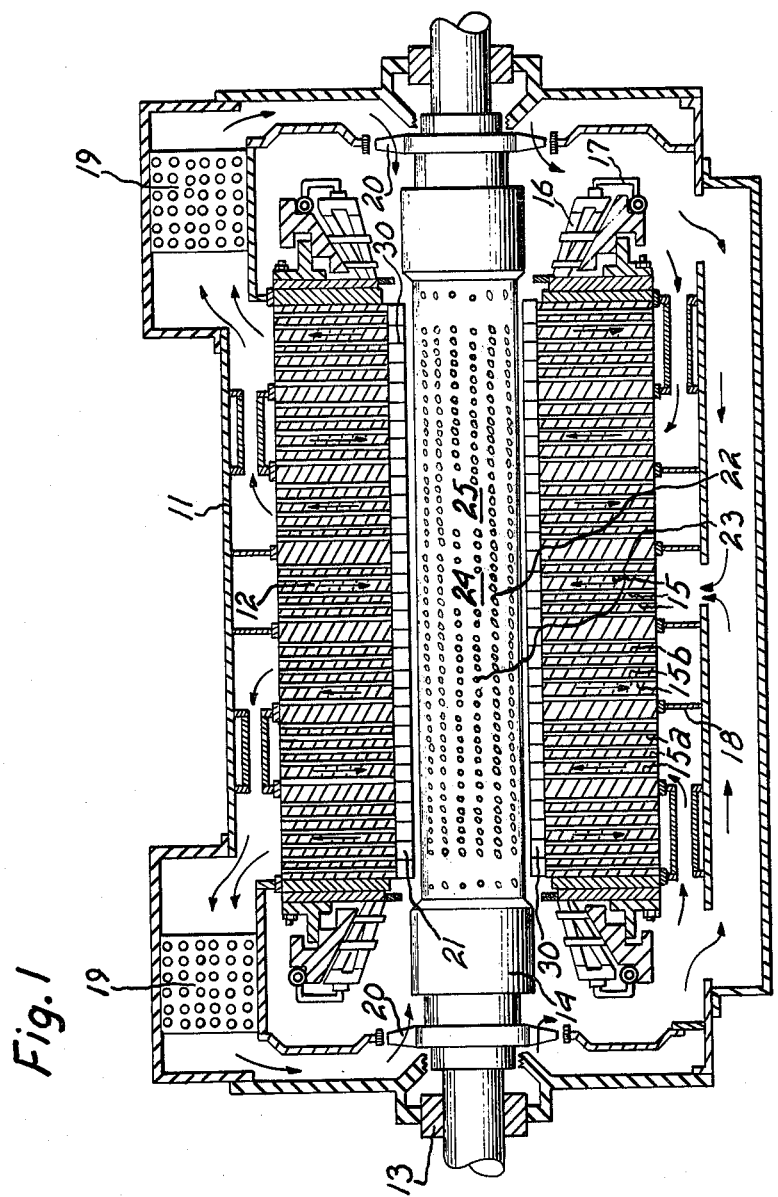
FIG. 1 is a composite plan and elevational view, partly in section, of a large hydrogen cooled generator constructed for improved cooling as herein taught.

In the schematic drawing of a large gas-cooled electrical generator shown in FIG. 1, the lower half of the drawing is rotated 90° with respect to the upper half to illustrate more clearly the components of the cooling system. The generator comprises an air-tight casing 11 which supports a laminated stator core 12 and has bearings 13 mounting a rotor 14 for rotation therein. The stator core 12 is composed of laminations assembled to define a large number of radial cooling ducts 15 spaced axially along the stator core and also in the circumferential direction. The stator windings 16 are cooled by liquid supplied through insulating hoses 17 and recirculated for cooling in an external system not here shown. A number of partitions 18 are arranged as illustrated between the casing and the stator core, and divide the casing into compartments serving to isolate cool radially in-flowing gas coolant from heated radially out-flowing gas coolant as indicated by the flow arrows. The stator is thereby divided axially into zones such that groups of radial stator ducts 15a carrying inwardly flowing gas alternate with groups of radial stator ducts 15b carrying outwardly flowing gas. The hydrogen or other gas coolant is circulated through the casing and through heat exchangers 19 by means of low pressure fans 20 on either end of the rotor. Alternatively, low pressure stator blowers can be provided.

Rotor 14 is a gap pickup rotor with provision for cooling by scooping gas coolant from the "air" gap 21 through scoop-like inlet pickups or ducts 22 and discharging it back to the gap through outlet ducts or holes 23. The rotor inlet pickups 22 and outlet ducts 23 are arranged axially in groups to provide alternating inlet zones 24 and outlet zones 25. In each inlet zone the rotor inlets 22 are aligned axially with a group of radial stator ducts 15a carrying cool inwardly flowing gas, whereas the rotor outlets 23 in each outlet zone are aligned axially with a group of radial stator ducts 15b carrying heated outwardly flowing gas. Such zone cooling is necessary in large generators having a length of about 20 to 30 feet. Gas moves longitudinally along the rotor between each inlet duct 22 and a corresponding outlet duct 23 at either side by means of flow passages extending diagonally down to the bottom of the rotor slot and then diagonally outward again through staggered holes formed in the rotor windings. This is shown schematically in FIG. 2 and is explained in greater detail in U.S. Pat. No. 2,986,664 to D. M. Willyoung.

Figure 2:
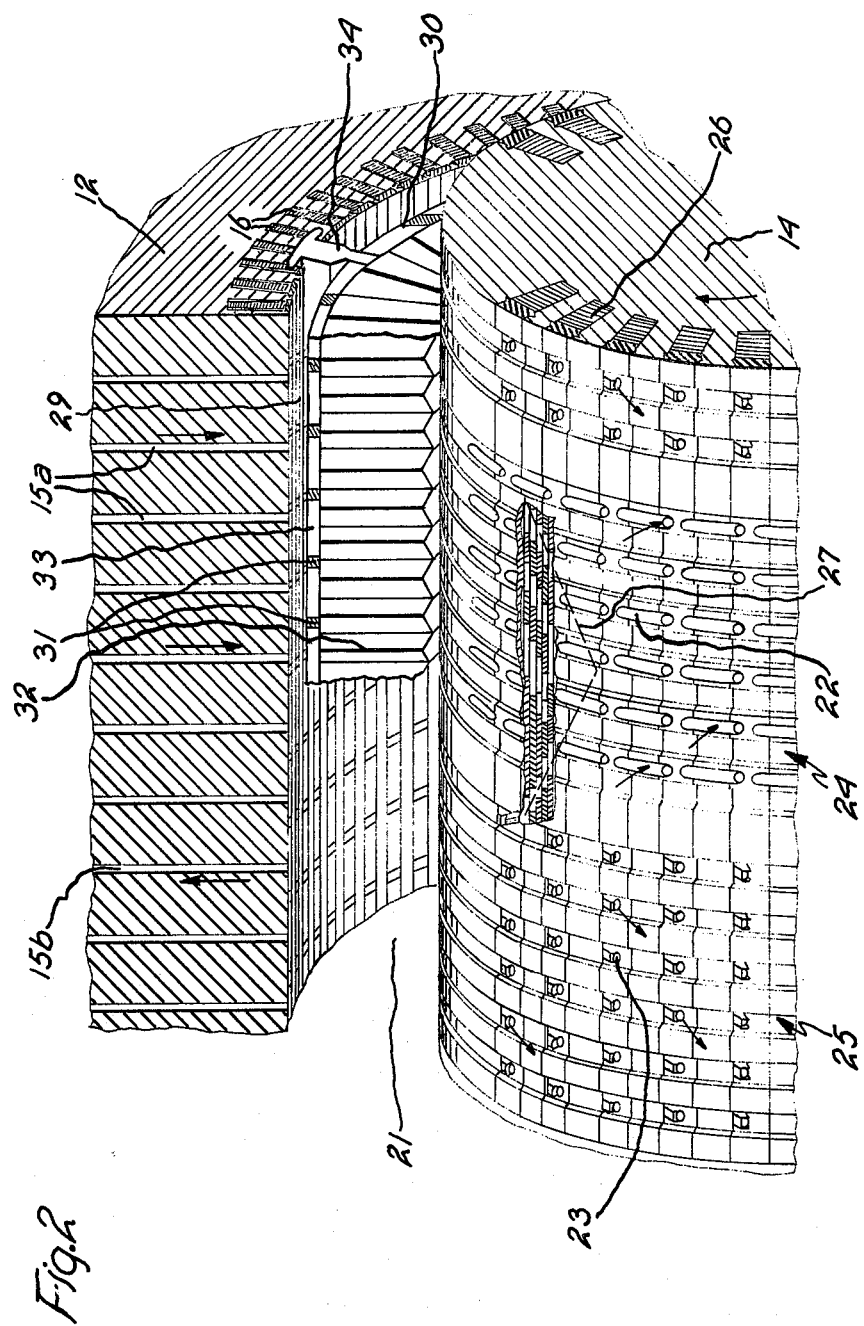
FIG. 2 is an enlarged partial perspective view, with parts broken away and in section, illustrating the assembled honeycomb stator insert and portions of the stator and rotor adjacent the gap.

Referring to FIG. 2, it is seen that the rotor windings 26 are provided by stacked axially extending conductors disposed in a plurality of circumferentially spaced radial slots. A portion of one of these rotor windings within a radial slot is broken away to illustrate a diagonal flow passage 27 for conducting the gas coolant between an inlet duct 22 and an outlet duct 23. In practice, there is associated with each rotor pickup a flow divider structure (or creepage block) to split the intake gas coolant flow into two diagonal passages connecting respectively to outlets at either side of the particular inlet zone. The scoop-shaped inlets 22 are substantially flush with the rotor surface and are contoured so as to convert the relative motion between the rotor and the coolant in the gap 21 into a pressure head for forcing the gas through the winding by a rotor pumping action. The outlets 23 have a raised deflector and are shaped to contribute to the pumping by Venturi action. By raising the outlets with respect to the rotor pickups, rotor ventilation is increased due to the increased pumping head and improved axial sealing of the honeycombed stator. Due to the rotation of the rotor, a swirl flow is created in the annular gap 21 between the stator and the rotor. In a large generator, the width of the gap 21 is typically four inches, permitting the completed rotor to be moved longitudinally inside of the completed stator during final assembly on the machine. The tendency for axial leakage of the gas coolant in such a large clearance, and in particular the mixing of the hot discharged coolant with the cool intake coolant, has already been mentioned.

Figure 3:
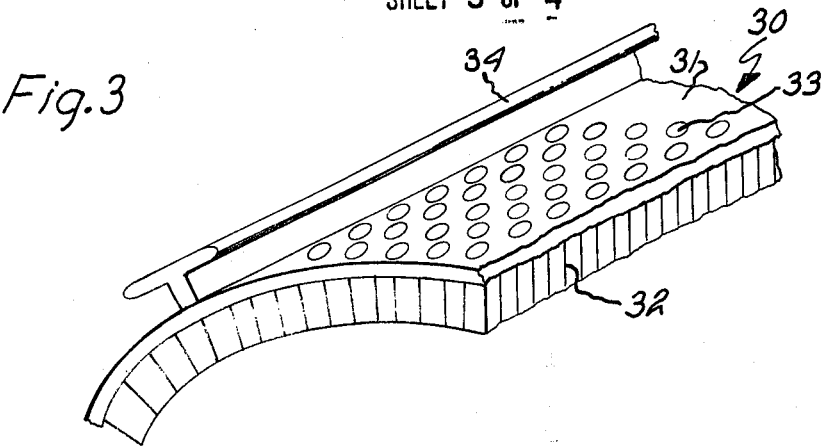
FIG. 3 is an enlarged partial perspective view of a honeycomb stator insert before assembly.
Figure 4:
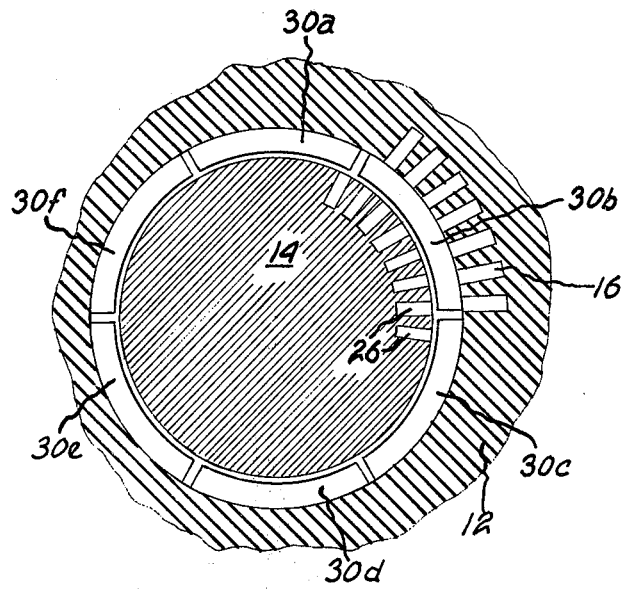
FIG. 4 is a simplified partial axial cross section through the generator.

In accordance with the invention, improved and more efficient ventilation of the generator or other dynamoelectric machine is obtained by providing one or more honeycomb stator inserts 30, supported by the stator core 12 and extending into the gap 21. The honeycomb stator inserts 30 are mounted on the machine after assembly of the rotor, and can be circumferentially continuous or substantially continuous while markedly reducing the effective gap clearance. Referring also to FIG. 3, each honeycomb stator insert 30 is comprised by an arcuate or curved perforated plate 31 having attached to its inner surface a large cell honeycomb baffle structure 32. The conventional inexpensively manufactured six-sided honeycomb material is preferred, however other appropriate cross sections can be used. The size of the holes 33 in the perforated plate 31 is not critical so long as there is a flow passage for gas coolant radially through each of the honeycomb cells. The perforated plate 31 and honeycomb cell structure 32 are made of a suitable non-magnetic metallic material or non-metallic material, such as aluminum, a non-magnetic steel, a suitable plastic, or fiberglass. One or more longitudinally extending support members or guide channels 34 are attached to the outer surface of the perforated plate 31 and facilitate the mounting of the honeycomb insert by sliding into correspondingly shaped grooves in the inner surface of the stator core 12. When the several honeycomb stator inserts or sectors for a given machine are all assembled, nearly complete peripheral closure of the gap 21 is achieved. This is illustrated schematically in FIG. 4, wherein the six honeycomb stator sectors 30a–30f each have an angular extent of about 60°. When inserted into the gap 21 (see FIG. 2), an annular clearance space 29 is provided between the stator core and the perforated plate 31 for the circulation of gas coolant. For a four-inch gap, typical dimensions are that the clearance space 29 has a one-half inch width, the honeycomb cells have a cross-sectional dimension of three-quarter inches to one inch, and the effective gap clearance between the rotor and the bottom of the honeycomb baffle structure 32 is about one-half inch.

With the generator in operation, cooled hydrogen gas is circulated by the fans 20 through the radial stator ducts 15a to the annular clearance space 29, and then through the holes 33 in the perforated plate 31 and the radial passages provided by the honeycomb baffle structure 32 to the reduced gap clearance space. The effect of the honeycomb stator insert 30 is to provide in a single structure combined axial and peripheral baffles. In the individual cells of the honeycomb baffle structure 32, radially inflowing gas coolant discharged into the gap clearance space between the rotor and the bottom of the honeycomb stator insert actually has, with respect to the rotor, a zero angular velocity. Because of the relatively small gap and the large friction to gas flow provided by the rough surface of the honeycomb baffle structure 32, there is a considerably reduced swirl flow and the gas velocity in the gap is relatively low. Consequently, the relative velocity between the gas coolant and the rotor inlets 22, and also at the outlets 23 is relatively high so as to realize greater pumping pressures to circulate the coolant through the rotor. In the outlet zones, of course, discharged heated coolant flows radially out through the passages in the honeycomb stator insert 30 to the radial stator ducts 15b. The axial baffling provided by the honeycomb stator insert 30 tends to block axial flow of coolant and materially reduces the axial leakage from an outlet zone to an inlet zone and vice versa. Accordingly, improved and more efficient zone pressurization is realized from the cooling fans or blowers. These improvements are enhanced by the fact that the assembled honeycomb stator insert sectors (see FIG. 4) are substantially peripherally continuous, since it is not necessary to leave a peripheral gap for sliding the rotor inside of the stator.

Figure 5:
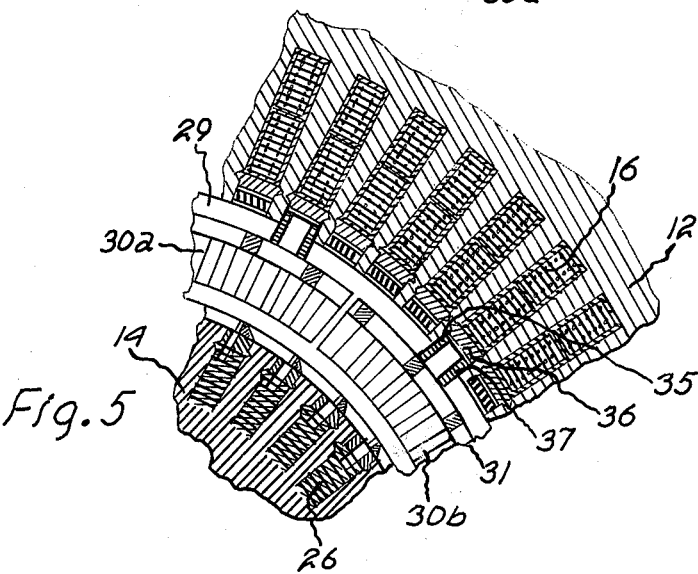
FIG. 5 is a partial axial cross section to a much larger scale than FIG. 4 showing a modification for mounting the honeycomb insert on the stator.

FIG. 5 shows the use of a split-spring wedge support member for mounting the honeycomb insert sectors on the stator core. Using the construction shown in FIG. 4 of U.S. Pat. No. 3,448,081 to D. M. Willyoung, a longitudinal groove 35 is provided inwardly of the wedge block 36 closing the end of the radial stator winding slot. The longitudinally extending split-spring wedge member 37 attached to the perforated plate 31 is self-locking in the groove 35 upon being slid into place.

Figure 6:
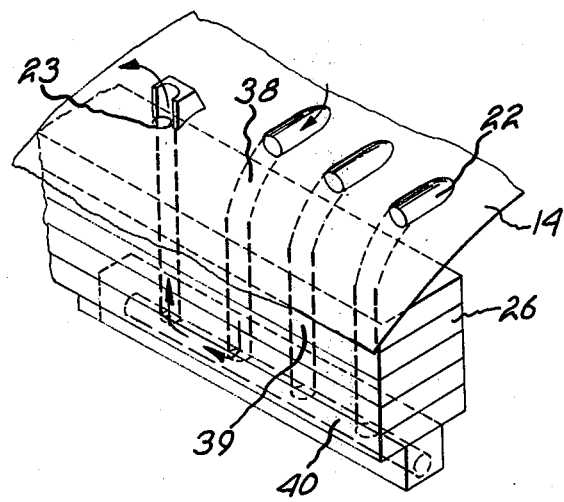
FIG. 6 is a schematic perspective view illustrating a modification of the rotor with radial passage and connecting axial ducts for coolant flow.

Rather than using the diagonal passages 27 in the rotor 14 for the flow of gas coolant from an inlet duct 22 to an outlet duct 23 (see FIG. 2) improved cooling is obtained by using a network of simple radial passages connecting to an axial duct beneath the rotor winding. This is illustrated schematically in FIG. 6, wherein a scoop-shaped rotor pickup 22 connects to a curved duct 38 and to a radial passage 39 provided by aligned holes in the individual stacked rotor conductors. The radial passages 39 connect to an underlying axial duct 40 which in turn has connection to the radial passages for the outlet ducts 23 in the adjacent outlet zones. As before, the self-pumping action of the rotating rotor causes the gas coolant to flow in the direction of the appropriate outlet holes. This arrangement avoids the system losses in the diagonal flow passage construction wherein the creepage block under the pickup splits the flow longitudinally into two diagonal passages as shown in the aforementioned U.S. Pat. No. 2,986,664.

While the invention has been particularly shown and described with reference to a preferred embodiment and modification thereof, it will be understood by those skilled in the art that various changes in form and details may be made therein without departing from the spirit and scope of the invention.

What is claimed is:

1. A gas-cooled dynamoelectric machine comprising
   a rotor mounted for rotation within a stator with an annular gap therebetween, and an air-tight casing enclosing said rotor and stator and means for cooling and recirculating a gas coolant within said casing,
   means defining a plurality of axially spaced radial stator ducts for conducting coolant to and from said gap, and means defining a plurality of axially spaced inlet and outlet rotor ducts and connecting passages for taking coolant from said gap and circulating coolant through said rotor and back into said gap, and
   at least one honeycomb stator insert mounted adjacent the inner surface of said stator extending into said gap to produce a substantially reduced effective gap clearance space and comprising a honeycomb baffle structure defining radial passages for coolant flow.

2. A dynamoelectric machine according to claim 1 wherein said honeycomb stator insert is substantially peripherally continuous.

3. A dynamoelectric machine according to claim 1 wherein a plurality of said honeycomb stator inserts are mounted adjacent to one another on said stator so as to be substantially peripherally continuous.

4. A dynamoelectric machine according to claim 1 wherein said honeycomb stator insert further includes a curved perforated plate to which said honeycomb baffle structure is attached, and a longitudinally extending support member secured to said perforated plate for mounting said insert in corresponding grooves in said stator.

5. A dynamoelectric machine according to claim 4 wherein said inlet and outlet rotor ducts and connecting passages include a network of radial passages and connecting axial ducts for the circulation of coolant through said rotor.

6. A gas-cooled dynamoelectric machine comprising
   a rotor mounted for rotation within a stator with an annular gap therebetween, and an air-tight casing enclosing said rotor and stator and means for cooling and recirculating a gas coolant within said casing,
   means defining a plurality of alternating axially spaced groups of radial stator ducts for respectively conducting coolant to and from said gap, and means for defining a plurality of corresponding alternating axially spaced groups of inlet and outlet rotor ducts and network of associated connecting passages for respectively scooping coolant from said gap and circulating coolant through said rotor and back into said gap, said groups of stator ducts and inlet and outlet rotor ducts being arranged in alternating zones for the inward flow of cooled coolant and the outward flow of heated coolant, and
   a plurality of honeycomb stator inserts slidably mounted adjacent to one another on said stator extending into said gap so as to be substantially peripherally continuous, said stator inserts each comprising a honeycomb baffle structure defining radial passages for the flow of coolant and reducing axial leakage between said zones.

7. A dynamoelectric machine according to claim 6 wherein each honeycomb stator insert further comprises a curved perforated plate to which said honeycomb baffle structure is attached, and a longitudinally extending support member secured to said perforated plate for mounting said insert in corresponding grooves in said stator.

8. A dynamoelectric machine according to claim 6 wherein said groups of inlet and outlet rotor ducts and network of associated connecting passages includes a network of radial passages and connecting axial ducts for the circulation of coolant through said rotor.

* * * * *